United States Patent

[11] 3,592,045

| [72] | Inventor | Edward L. Weiss<br>Quakertown, Pa. |
|---|---|---|
| [21] | Appl. No. | 783,283 |
| [22] | Filed | Dec. 12, 1968 |
| [45] | Patented | July 13, 1971 |
| [73] | Assignee | Leeds & Northrup Company<br>Philadelphia, Pa. |

[54] PROCESS ANALYSIS PROGRAMMER
17 Claims, 11 Drawing Figs.

[52] U.S. Cl. .................................................... 73/23.1,
23/255, 235/151.35
[51] Int. Cl. ..................................................G01n 31/08,
G06f 15/20
[50] Field of Search .......................................... 73/23, 23.1;
23/252; 137/81.5; 235/92, 151, 151.1, 151.12,
151.13, 151.3, 151.35, 200, 201; 58/145;
340/172.5; 308/42, 48, 49, 55, 73—75; 307/208,
221, 222, 232, 234, 235; 55/271, 67, 197, 386

[56] References Cited
UNITED STATES PATENTS

| 3,306,096 | 2/1967 | Hana | 73/23.1 |
| 3,309,678 | 3/1967 | Sargent | 235/151.1 X |
| 3,116,456 | 12/1963 | Riker | 307/208 X |
| 3,316,751 | 5/1967 | Burk | 73/23.1 |
| 3,383,525 | 5/1968 | Arksey | 328/72 |
| 3,343,136 | 9/1967 | Nyberg | 328/55 |

*Primary Examiner*—Richard C. Queisser
*Assistant Examiner*—C. E. Snee, III
*Attorney*—Woodcock, Washburn, Kurtz & Mackiewicz ABSTRACT: A digital programmer adapted to program functions in chromatography, uses a function counter to actuate each of the functions and a master counter as the cycle clock, all operable from a single-pulse generator. During a setup cycle, each function counter is started when its function occurs. Alternatively, reversible counters are started in reverse counting at time zero, and stopped at the desired time of the function during the setup cycle. In subsequent cycles, the zero count of that counter is used to program its corresponding function. The count in any function counter may be altered relative to the master counter during subsequent cycles for program updating or error correction, either manually or automatically.

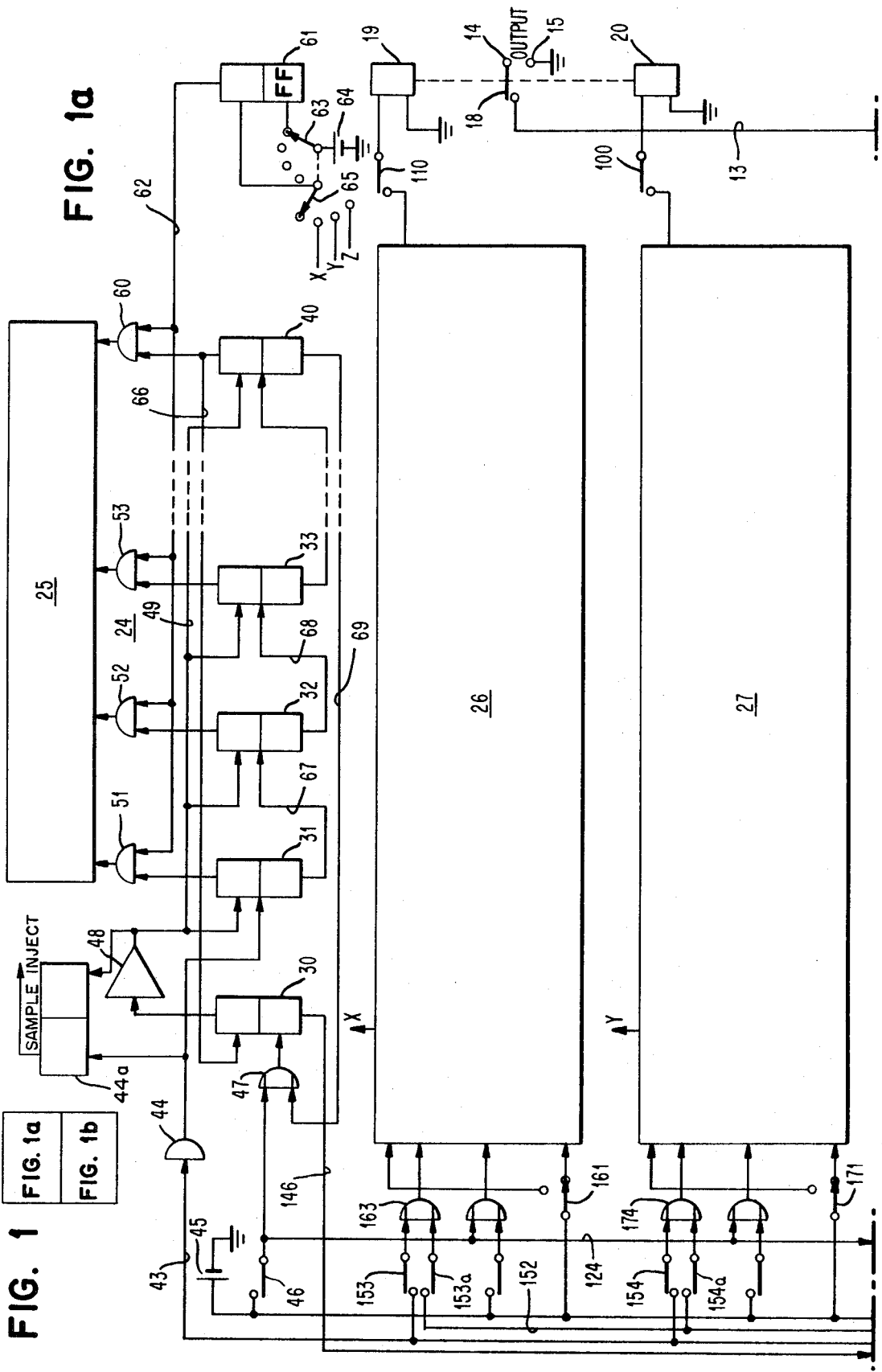

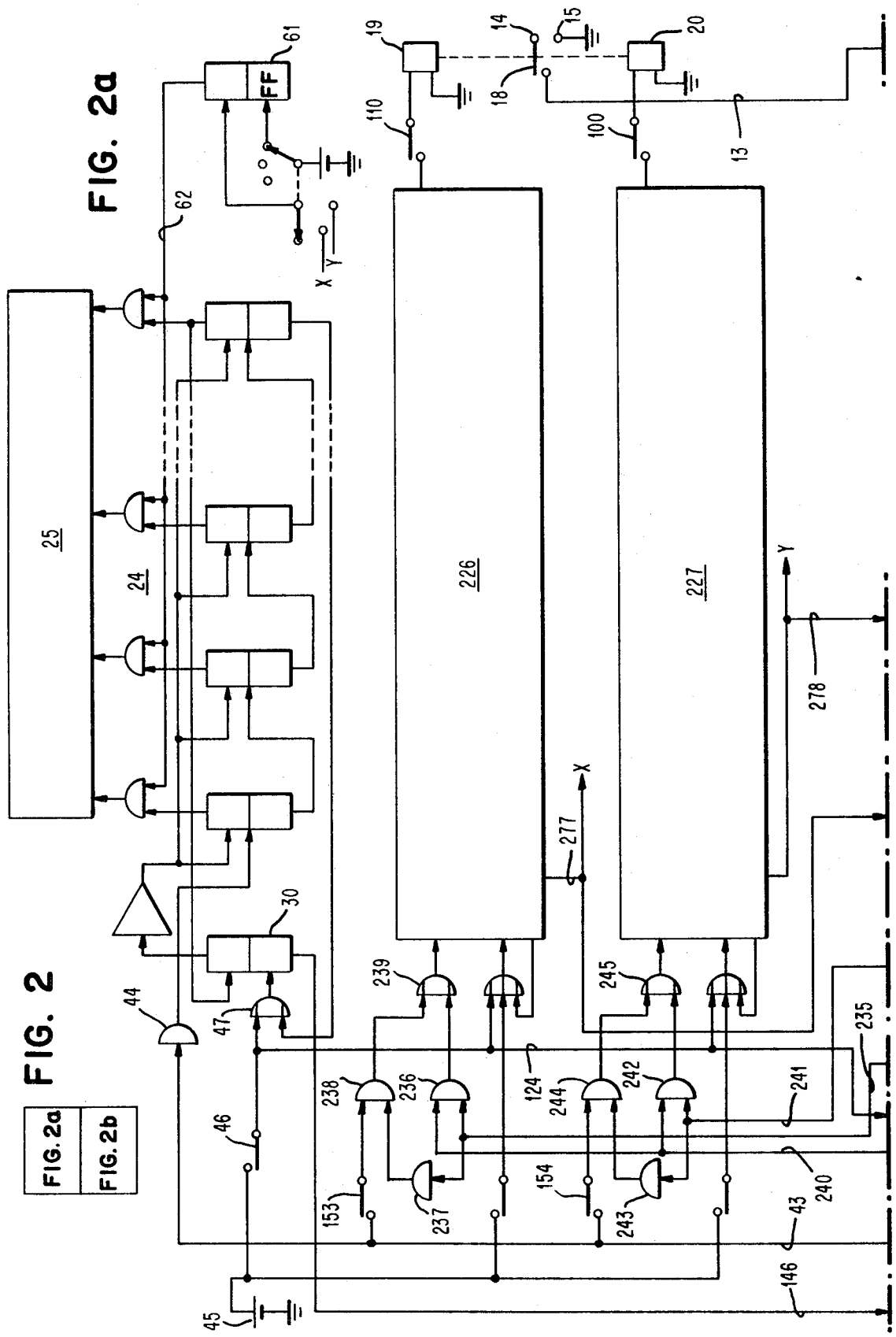

| FIG. 4a |
|---|
| FIG. 4b |

PROCESS ANALYSIS PROGRAMMER

BACKGROUND OF THE INVENTION

Programmers are necessary in process gas chromatography for monitoring and control of the process. For example, it may be desirable to connect the detector to the recorder only during selected times when the detection of certain peaks is expected. At other times the recorder is disconnected from the detector to prevent recording of noise or extraneous peaks. Another example of a function to be performed during the processing is the zero balance of the detector which must be performed in a time interval between the detection of two peaks of interest.

One of the earliest program timers is the motor driven cam assembly. Each cam is individually set for the occurrence of a function. Such a system is the Chromamax II manufactured by Leeds & Northrup Company and shown in FIG. 10–8 on page 523 of "The Practice of Gas Chromatography," Interscience Publishers, a division of John Wiley & Sons, 1967. Such a system requires considerable time and skilled labor to set up the program.

Another type of program timer presently in use is the electro-optical system in which a transparent disc or belt is used to represent the cycle time. The location of each function is designated by dark pencil marks obstructing the light path of a photocell circuit. Such a system is shown in U.S. Pat. No. 3,023,605. Such a system also requires considerable skill to set up the program.

Another type program timer uses a magnetic disc or tape. The ease with which one can insert a function is obvious. Alterations are also easily made. Such a system is shown in U.S. Pat. No. 3,205,701. Dirt and wear of the magnetic sensor are the principal disadvantages of such a system.

Still another type of program timer uses electronic digital logic circuits to count pulses from a source of clock pulses. Such a system is described by James E. Oberholtzer in "Digital Control of Sample Introduction and Data Readout in Gas Chromatography," Analytical Chemistry, Vol. 39, No. 8, pp. 959–964. The desired pulse count is stored in settings of a plurality of thumb switches each corresponding to some function. The coincidence of the electronic counter and the thumb switch actuates a relay to allow the desired function to be applied to a control system. The provision of thumb switches for each function and the attendant complex wiring is disadvantageous.

SUMMARY OF THE INVENTION

This invention relates to methods of and means for automatically programming process analysis systems and more particularly to process gas chromatography wherein the constituents of the sample are detected and control elements are actuated in timed sequence with the detection of said constituents.

In the particular embodiments of the invention, a cycle counter, or a master counter, counts the pulses from a source of clock pulses. A plurality of function counters are provided for controlling the time sequence of the operation of control elements which perform desired functions in the system. During a setup cycle, pulses are supplied to the cycle counter and selectively supplied to the function counters so that the count in each of the function counters at the end of the setup cycle represents the desired occurrence time of each function relative to the sample injection. In one embodiment, the function counters are reversible counters. During the setup cycle, the function counters are set to count in the reverse direction for the time interval between sample injection and the desired occurrence of the function being controlled. Upon this occurrence, the counting of the function counter is stopped.

In another embodiment of the invention, the function counters are one-way binary counters which count only in the forward direction. During the setup cycle, the function counters are not started at time zero, that is, at the time of sample injection. Rather, the function counters are started at the desired time of occurrence of the function to be performed. At the end of the setup cycle, the count in the function counters represents the desired time of occurrence of the function relative to sample injection. In this case, the count is the complement of the count between sample injection and the occurrence of the function. Then during a run cycle the counters are counted down so that the zero count stage in each function counter is actuated at the desired time of occurrence of the function to be performed.

In accordance with an important aspect of this invention, circuitry is provided to correct the count in each of the function counters so that the desired function will be performed at the proper time in subsequent runs even though this occurrence time may shift due to drift, setup error, or various other reasons. In one embodiment, this correction circuitry provides automatic updating. The output of the sample detector is sensed at the time the functions are to be performed. If the output of the sample detector at these times is outside of predetermined limits, i.e., above or below a given level, then the automatic correction circuitry is actuated.

In accordance with other aspects of the present invention, a display device is provided to display the time that any of the desired functions is performed. Also, an alarm circuit is provided to indicate that the time spacing between the detection of two constituents is below a desired minimum. This feature is particularly advantageous in gas chromatography wherein it is necessary to perform a zero balance for the sample detector in a time interval between the detection of two constituents.

In accordance with another aspect of the present invention, fluid logic is used to actuate a control element, or control elements, of the system. In many applications, fluid, or hydraulic, actuators are required. For example, such actuators are particularly desirable for use where substantial power must be supplied to the actuator. Also, in many applications, it is unacceptable to use an electrical relay actuator because they present an electrical hazard. This is particularly a problem in the chemical industry. Therefore, the use of fluid logic for actuating the control element in accordance with the present invention is a particularly suitable way of obtaining control element actuation.

Accordingly, it is an important object of the present invention to provide a programmer for gas chromatography in which a cycle counter and a plurality of function counters are selectively supplied with pulses during a setup cycle and in which the zero count stage of each of the function counters controls the performance of a desired function during a run cycle.

It is another object of the present invention to provide correction circuitry, and more particularly automatic updating circuitry, for correcting the count in the function counters to coincide with the occurrence of functions to be performed in a programmed process analysis system.

It is another object of the present invention to provide a display device for displaying the time that a function is performed relative to sample injection.

It is another object of the present invention to provide alarm circuitry for indicating when the time spacing between the detection of two constituents is less than a desired minimum.

It is another object of the present invention to provide fluid logic for fluid actuation of at least one of the control elements.

The foregoing and other objects, features, and advantages of the invention will be better understood from the following more detailed description and appended claims.

BRIEF DESCRIPTION OF THE DRAWINGS

For a more detailed understanding of the invention, reference is made in the subsequent description of preferred embodiments thereof shown in the accompanying drawings in which:

FIG. 1 shows the manner in which FIGS. 1a and 1b fit together;

FIGS. 1a and 1b show a diagram of the programmer using reversible function counters;

FIG. 2 shows the manner in which FIGS. 2a and 2b fit together;

FIGS. 2a and 2b show a diagram of the programmer using one-way binary function counters including updating circuitry;

DESCRIPTION OF THE PREFERRED EMBODIMENTS OF THE INVENTION

REVERSIBLE FUNCTION COUNTERS, FIG. 1

Figure 1B:
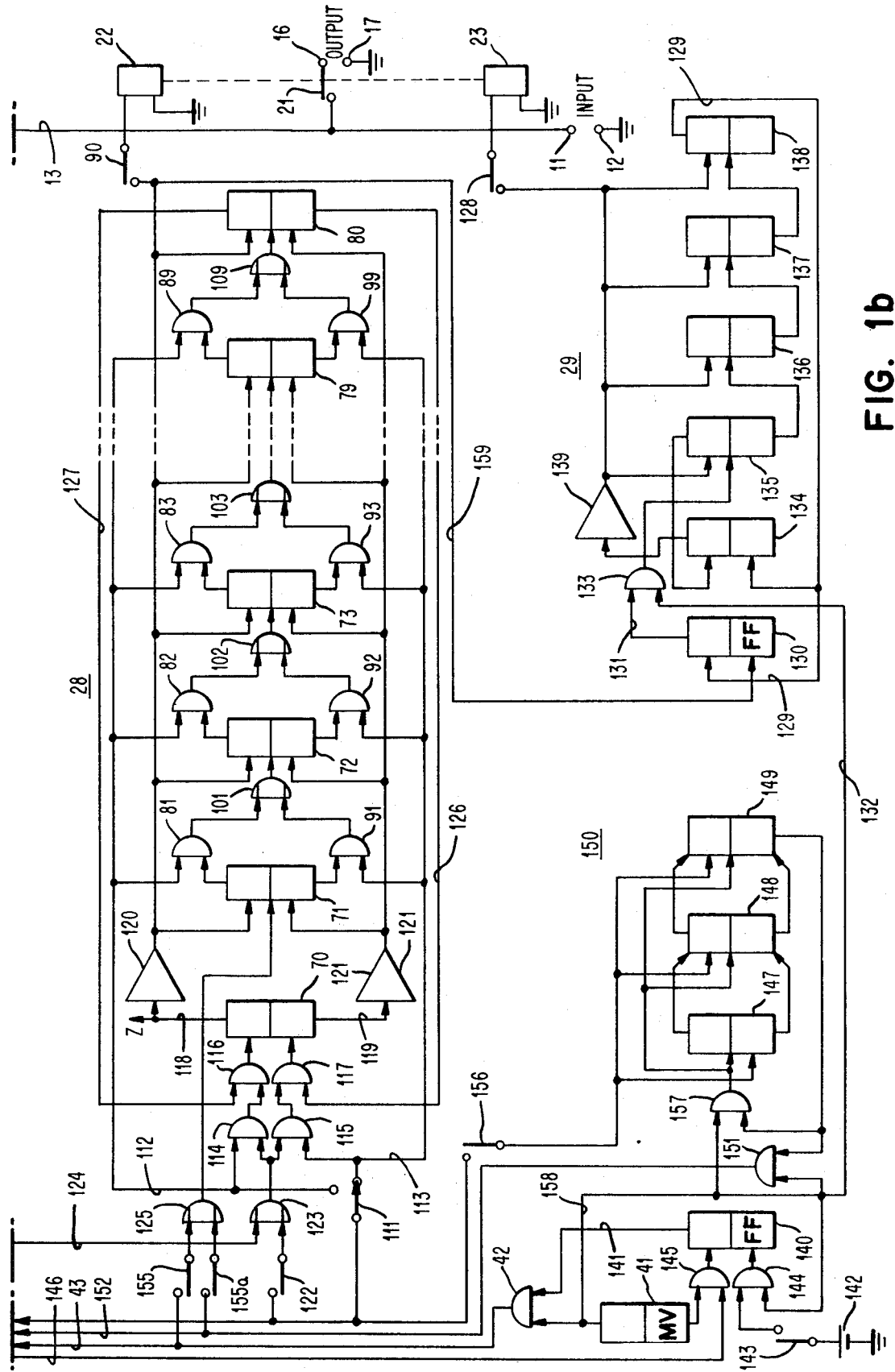

One embodiment of the electronic programmer for process gas chromatography is shown in FIG. 1. Analog signals from a sample gas detector are applied to input terminals 11 ad 12. Terminal 11 is connected by conductor 13 to output terminals 14 and 16. Terminals 12, 15 and 17 are circuit common connections. Terminals 14, 15 and 16, 17 may be connected to some control function for the process. The output terminal 14 is connected to input terminal 11 by switching contact 18 of a relay having energizing coils 19 and 20. Similarly, output terminal 16 is connected to input terminal 11 by relay contact 21 actuated by coils 22 and 23. Energization of coils 19, 20, 22 and 23 is controlled by the zero count stages of function counters 26, 27, 28 and elapsed time counter 29, respectively.

Master counter, or cycle counter, 24 serves as the program cycle duration clock. An associated indicating device 25 may be used to indicate the successive counts of the master counter or it may be used to indicate the count of the master counter 24 at the occurrence of zero count of a particular function counter.

The master counter 24 is shown as a 10-bit binary counter having stages 31—40 plus a zero count stage 30. The master counter 24, function counters 26, 27, 28 and elapsed time counter 29 are all driven by the same source of pulses shown in FIG. 1 as multivibrator 41. The cycle time of the programmer may be easily changed by changing the repetition rate of the multivibrator 41.

At the beginning of a program setup cycle, master counter 24 is reset by momentarily closing switch 46, applying a positive potential from battery 45 by way of OR gate 47 to zero count flip-flop 30. This reset action produces a "1" state output signal from zero count flip-flop 30 which is amplified by amplifier 48 and is used to reset stages 31—40 of master counter 24 to "0" state via conductor 49.

During the normal counting of master counter 24, the "1" state output from each of the stages 31—40 is applied by way of AND gates 51—60 to the indicating device 25. These AND gates are enabled by a "1" signal on conductor 62 from the output of control flip-flop 61. The state flip-flop 61 is controlled by switch contacts 63 and 65. When switch contacts 63, 65 are in their extreme clockwise position, a positive potential from battery 64 is applied to flip-flop 61 to produce a "1" state output on conductor 62. When switch contacts 63, 65 are in any of the other switching positions, flip-flop 61 may be reset by pulses appearing on lines X, Y or Z representing a zero count in function counters 26, 27 or 28 respectively, to reset flip-flop 61, thereby producing a "0" output signal on conductor 62. The "0" signal on conductor 62 disables all of the AND gates 51—60 thus freezing the count display in indicator 25. Therefore, the count in indicator 25 represents the occurrence of a zero count of the function counter which resets the flip-flop 61. It is also the time displacement between the zero count of a particular function counter and the zero count of the master counter. The repetition rate of multivibrator 41 is assumed to be known or easily determined.

The counting operation of the master counter 24 will now be described. It will be recalled that at the beginning of a program setup cycle the master counter 24 and function counters 26, 27, and 28 are reset by momentarily closing switch 46. Assuming AND gate 42 has been enabled, pulses from multivibrator 41 are applied via conductor 43 and inverter 44 to stage 31 for master counter 24 to start counting.

The first pulse passing through inverter 44 changes stage 31 from a "0" state to a "1" state. As previously explained, this "1" state will produce a "1" signal applied through AND gate 51 to indicating device 25, assuming AND gate 51 had been previously enabled. The indicating device 25 will then display a one count.

The second pulse passing through inverter 44 changes stage 31 back to the "0" state. The "0" state of stage 31 produces a "1" signal on conductor 67 to change stage 32 from a "0" state to the "1" state. Now the "1" state of stage 32 will produce a "1" signal applied through AND gate 52 to indicating device 25 to display a two count. Again, it is assumed that AND gate 52 had been previously enabled. Since stage 31 is now in the "0" state, there is no "1" signal applied through AND gate 51 to indicating device 25.

The third pulse passing through inverter 44 changes stage 31 again to the "1" state. The "1" state of stage 31 does not produce a "1" signal on conductor 67 and stage 32 remains in the "1" state. It can be seen at once the indicating device 25 will now display a count of three.

The fourth pulse passing through inverter 44 changes stage 31 to a "0" state producing a "1" signal on conductor 67 which changes stage 32 to a "0" state also producing a "1" signal on conductor 68 which in turn changes stage 33 to a "1" state. The "1" state of stage 33, acting through enabled AND gate 53, will produce a four count display in indicating device 25. Stages 31 and 32 are both in the "0" state and do not add any count display. It is to be noted that in the above description, stage 31 represents one count, stage 32 represents two counts, stage 33 represents four counts, etc. The description adheres to the binary counting notation.

The above described counting procedure continues until stage 40 is in the "1" state and all of the stages 31—39 are in the "0" state. At this instant, a "1" signal from stage 40 is applied via conductor 66 to reset stage 30 to the "0" state. The count display now in indicator 25 is 512. It will take 511 more counts for stages 31—39 all to have the "1" state. The pulse after that will change all of the stages 31—40 to the "0" state. The "0" state of stage 40 will produce a "1" signal via conductor 69 and OR gate 47 to set stage 30 to the "1" state, thereby completing the counting cycle. The counter is ready for the next counting cycle.

Function counters 26, 27, 28 are also binary counters but they are adapted to count in the reverse direction as well as in the forward direction. During the setup cycle, master counter 24 counts in the forward direction while function counters 26, 27, 28 count in the reverse direction because switches 161, 171 and 111 are set in the upper position. At the occurrence of a desired function, the corresponding function counter is stopped, for example, by opening switch 155 to interrupt the supply of pulses to function counter 28. The detail operation of function counter 28 will now be described.

During the setup cycle, switch 111 is in the upper position applying a positive potential from battery 45 to AND gates 114 and 81—89 to enable these gates. The momentary closure of switch 46 also applies a reset pulse via conductor 124, OR gate 123, enabled AND gate 114, and OR gate 116 to reset flip-flop 70 to the "0" state. The "0" state of flip-flop 70 produces a "1" signal on conductor 119 which is applied via amplifier 121 to set all of the flip-flops 71—80 to the "1" state. If only function counter 28 needs to be reset, it is only necessary to momentarily close switch 122.

Function counter 28 will start to count in the reverse direction simultaneously with the start of the master counter 24. Pulses from multivibrator 41 are applied via enabled AND gate 42, conductor 43, switch 155, and OR gate 125 to stage 71 to change that stage from the "1" state to a "0" state which is equivalent to subtracting one count from function counter 28 or a reverse count of one.

The second pulse applied to flip-flop 71 changes that flip-flop back to a "1" state producing a "1" signal output via enabled AND gate 81, and OR gate 101 to change the "1" state of flip-flop 72 to a "0" state. Two counts have now been subtracted from function counter 28.

The third pulse applied to flip-flop 71 changes that flip-flop again to a "0" state but there is no "1" signal output applied to flip-flop 72 because AND GATE 91 was not enabled. Three counts have now been subtracted from function counter 28.

The fourth pulse applied to flip-flop 71 changes that flip-flop back to a "1" state producing a "1" signal output via enabled AND gate 81 and OR gate 101 to change the "0" state of flip-flop 72 back to the "1" state. The change of flip-flop 72 from a "0" state back to the "1" state produces a "1" signal output via enabled AND gate 82, and OR gate 102 to change flip-flop 73 to a "0" state. Four counts have now been subtracted from function counter 28.

At the occurrence of the desired function, switch 155 is opened and the above described operation stops. After the setup cycle, switch 111 is returned to the lower position for normal forward counting. With switch 111 in the lower position, AND gates 115, 91—99 are enabled while AND gates 114, 81—89 are disabled. Function counter 28 is now ready for the run cycle. It is to be noted that one extra count in the forward direction is necessary for the function counter to reach zero count. The adjustment of this discrepancy will be discussed later.

In accordance with an important feature of this invention, sample injection is controlled by a flip-flop 44a which is reset by the output of amplifier 48 and is set by the output from inverter 44. Subsequent pulses from inverter 44 do not change the state of this flip-flop. In this manner, the need only depress the start switch 143 to start the process. The sample injection occurs coincidentally with the production of the first pulse which is supplied to the various counters.

While the system is described as performing the switching between the detector and the recorder, actually the system has its greatest use in controlling a process. For example, the output terminals 14, 15 may be connected to an element in the process control system which is to be actuated at the beginning of peak 302 of FIG. 3 (to be discussed later). In this case, the controlled element is connected across output terminals 14, 15. Another example of operation of the programmer is in performing column switching. In this case, the outputs from different columns are selectively supplied to a recorder at the desired times.

From the foregoing, one of the principle advantages of the present invention over prior art electronic programmers of the type shown, for example, in the Oberholtzer article, can be appreciated. Note that there is no need for setting dials, such as the thumb switches in Oberholtzer's system. Further, the complex wiring which is associated with such setting devices is obviated. Provision of separate function counters for each function and circuitry for detecting the actuation of the zero count stage in each counter simplifies both the operation and the circuitry of the system of the present invention.

OPERATION OF FIG. 1

The operation of the system in programming a process in gas chromatography operation is now to be described. The master counter 24 is used as the cycle timing clock and is started concurrently with the time the gas sample is injected into the constituent separating column. The master counter 24 is started for the program setup cycle by momentarily closing start switch 143 which enables AND gate 144, allowing pulses from multivibrator 41 via conductor 158 to pass through AND gate 144 to set run flip-flop 140 to the "1" state. The 1 output of run flip-flop 140 is applied via conductor 141 to enable AND gate 42, allowing pulses from multivibrator 41 to pass through AND gate 42 via conductor 43 and inverter 44 to the master counter. These pulses on conductor 43 are also applied to function counters 26, 27, 28 by way of closed switches 153, 154, 155. Switches 111, 171, 161 have previously been set to the upper position so the function counters count in the reverse direction. Also, switches 90, 100, 110, 128 have been previously set in the open position to prevent energization of relay coils 22, 20, 19, 23, respectively.

At the beginning of the first desired peak (for instance 302 in FIG. 3), switch 153 is opened to prevent any further pulses on conductor 43 from being applied via OR gate 163 to function counter 26. (The purpose of switches 153a, 154a and 155a is to be described later in conjunction with ring counter 150, also referred to as correction counter 150.) Function counter 26 is now changed to forward counting by throwing switch 161 to the lower position.

At the end of the first desired peak 303, switch 154 is opened to prevent any further pulses on conductor 43 from being applied via OR gate 174 to function counter 27. Function counter 27 is now changed to forward counting by throwing switch 171 to the lower position.

At the beginning of the second desired peak (for instance 303 in FIG. 3), switch 155 is opened to prevent any further pulses on conductor 43 from being applied via OR gate 125 to function counter 28. Function counter 28 is now changed to forward counting by throwing switch 111 to the lower position. Elapsed time counter 29 may be used to time the end of a desired function. More particularly, it is useful to time fixed duration operations that occur a fixed number of counts after the end of peak 303. This is useful for zero balancing.

Elapsed time counter 29 is a fixed duration counter and is shown in FIG. 1 to be started by the zero count in function counter 28 during its normal run cycle. The zero count in function counter 28 produces a "1" signal output from stage 70. This is applied via amplifier 120 to reset all of the stages 71—80 to the zero state. It also energizes relay coil 22 if switch 90 is in the closed position. It is also applied via conductor 159 to set flip-flop 130 to the "1" state. With flip-flop 130 in the "1" state, a "1" signal output appears on conductor 131 to enable AND gate 133. The enabled AND gate 133 allows pulses from multivibrator 41 via conductors 158, 132 to pass through AND gate 133 to flip-flop 135 of elapsed time counter 29.

Elapsed time counter 29 is a binary counter. At the eighth pulse flip-flop 138 will be changed to the "1" state producing a "1" signal output on conductor 129 to reset flip-flop 130 whose "0" signal output disables AND gate 133. That same "1" signal from flip-flop 138 sets zero count stage 134 to the "1" state producing a "1" signal output which is amplified by amplifier 139 to reset all of the flip-flops 135—138 and to energize relay coil 23 if switch 128 is in the closed position.

Assuming all of the functions have been programmed in the manner described above, the system is now ready for a first run cycle to ascertain whether function counters 26, 27 and 28 have been set correctly. Again switches 153, 154 and 155 are closed. Switches 90, 100, 110 and 128 are also closed. Master counter 24 and function counters 26, 27 and 28 are all counting forward now. Master counter 24, of course, will be starting from zero count, but each of the function counters 26, 27, 28 had counted a certain number of pulses in the reverse direction.

More particularly, counter 26 counts a number of counts representing the time duration between time zero and the beginning of peak 302. Counter 27 counts a number of counts representing the time duration between time zero and the end of peak 302. Counter 28 counts a number of counts representing the time duration between time zero and the beginning of peak 303. While only three function counters have been shown, it will be appreciated that many more will be provided to count the time duration of other functions, i.e., the end of peak 303, the beginning of peak 304 and so on.

During the run cycle, each function counter will count the respective number of pulses plus an additional pulse before zero count occurs. (It takes one additional pulse to change the "1" state in all of the stages to a "0" state in all of the stages.) Specifically, the zero count of function counter 26 occurs that number of pulses later and should correspond with the start of peak 302, etc. If it does not, corrections will have to be made. The method of correcting will be described later.

During a run cycle, the counter 26 produces a zero count which energizes the relay 19 at the expected time of the beginning of the peak 302. The contacts 18 are closed, thereby connecting the detector to the recorder.

At the expected time of the end of peak 302, the zero count stage of counter 27 is actuated, thereby energizing relay 20 which opens the contacts 18. At the expected time of the beginning of peak 303, the counter 28 produces a zero count which energizes relay 22 thereby closing the contacts 21. This connects the detector to the output terminals 16, 17.

As shown in FIG. 1, the contacts 21 are opened when the fixed interval counter 29 reaches a zero count. Counter 29 started counting at the end of peak 302. A number of counts after this, the relay 23 is energized thereby opening the contacts 21.

It is possible to read the actual pulse count that the zero count in function counter 26 lags the zero count of the master counter 24. This is accomplished by making use of the zero count signal at terminal X of function counter 26. When switch 65 is turned to the second position, the zero count signal at terminal X is applied to reset flip-flop 61 to its "0" state thus disabling AND gates 51—60 and preventing changes in the count display in indicating device 25.

To read the zero count lag of function counter 27, it is only necessary to turn switch 65 to the extreme right position to reset flip-flop 61 to the "1" state to enable AND gates 51—60; and then to turn switch 65 to the third position so the zero count signal on the Y terminal sets flip-flop 61 to the "0" state.

CORRECTION CIRCUITRY

If there had been an error in the previously described programming procedure, the circuit associated with correction counter 150 may be used to correct the error. For example, in watching a recorder plotting the output signal from a separating column detector, it is most common to open switch 153 after the initial slope of peak 302 has started. It follows that during run cycles, the reset signal at terminal X will energize relay coil 19 after the start of the slope. In addition, relay coil 19 has a certain amount of lag itself. Therefore, relay contact 18 will be closed after the start of the slope. If it is desired to close relay contact 18 slightly before the start of the slope, the circuit associated with correction counter 150 may be used to advantage and will now be described.

For the zero count in function counter 26 to occur earlier (reduction of lag between function counter 26 and master counter 24), it is necessary to add some pulses to the function counter 26. (That is, counter 26 must count in the forward direction for correction.) For illustration purposes in FIG. 1, the correction counter 150 adds 2 pulses. The run flip-flop 140 must be in the stop or "0" state. Switch 153a may be closed and switch 156 momentarily closed to reset ring counter stage 147 to a "1" state and stages 148 and 149 to the "0" state. The "0" state produces a signal to enable AND gates 151 and 157. Enabled AND gate 151 allows pulses from multivibrator 41 to travel by way of conductor 152, closed switch 153a, and OR gate 163 to add counts to function counter 26. At the same time, enabled AND gate 157 also allows pulses from multivibrator 41 to step correction counter 150. The first pulse will step the "1" state of stage 147 to stage 148. The second pulse will step the "1" state from stage 148 to stage 149. The "1" state of stage 149 disables AND gates 151 and 157 preventing any more pulses from reaching function counter 26.

According to the foregoing description, only two pulses were added to the count of function counter 26. These two pulses were selectively supplied through AND gate 151 to the function counter to be corrected. AND gate 151 is inhibited when correction counter 150 has stepped through a predetermined number of stages so that only a fixed number of pulses are supplied to the function counter during a correction cycle. Three stages providing two correction counts are shown in FIG. 1. At the end of manual correction, switch 153a must now be opened.

In the foregoing description, switch 161 was assumed to be in the lower position for forward counting. If switch 161 was in the upper position, the function counter 26 would be in the reverse counting mode and the two pulses applied will be added to the reverse count of function counter 26. Adding in reverse is equivalent to increasing the lag between function counter 26 and master counter 24. Switches 154a and 155a are provided to add counts to function counters 27 and 28 respectively.

It will be recalled that, when master counter 24 is reset, state 30 is set to the "1" state. This "1" state produces a signal on conductor 146 and is applied to one of the inputs to AND gate 145. The other input to AND gate 145 is from multivibrator 41. When both of the inputs to AND gate 145 is from multivibrator 41. When both of the inputs to AND gate 145 are energized, the output will reset run flip-flop 140 to the "1" state and hence inhibit AND gate 42 preventing any more pulses from reaching conductor 43. This single-cycle operation of the master counter 24 is accomplished by momentarily closing switch 143. If switch 143 is left in the closed position, then the next pulse from multivibrator 41 by way of conductor 158 will satisfy the AND gate 144 and again set the run flip-flop in the run condition. Under the continuous operation, the cycles will be repeated one after the other until switch 143 is opened and the operation will terminate at the end of that cycle.

OPERATION OF FIG. 2

Figure 2B:
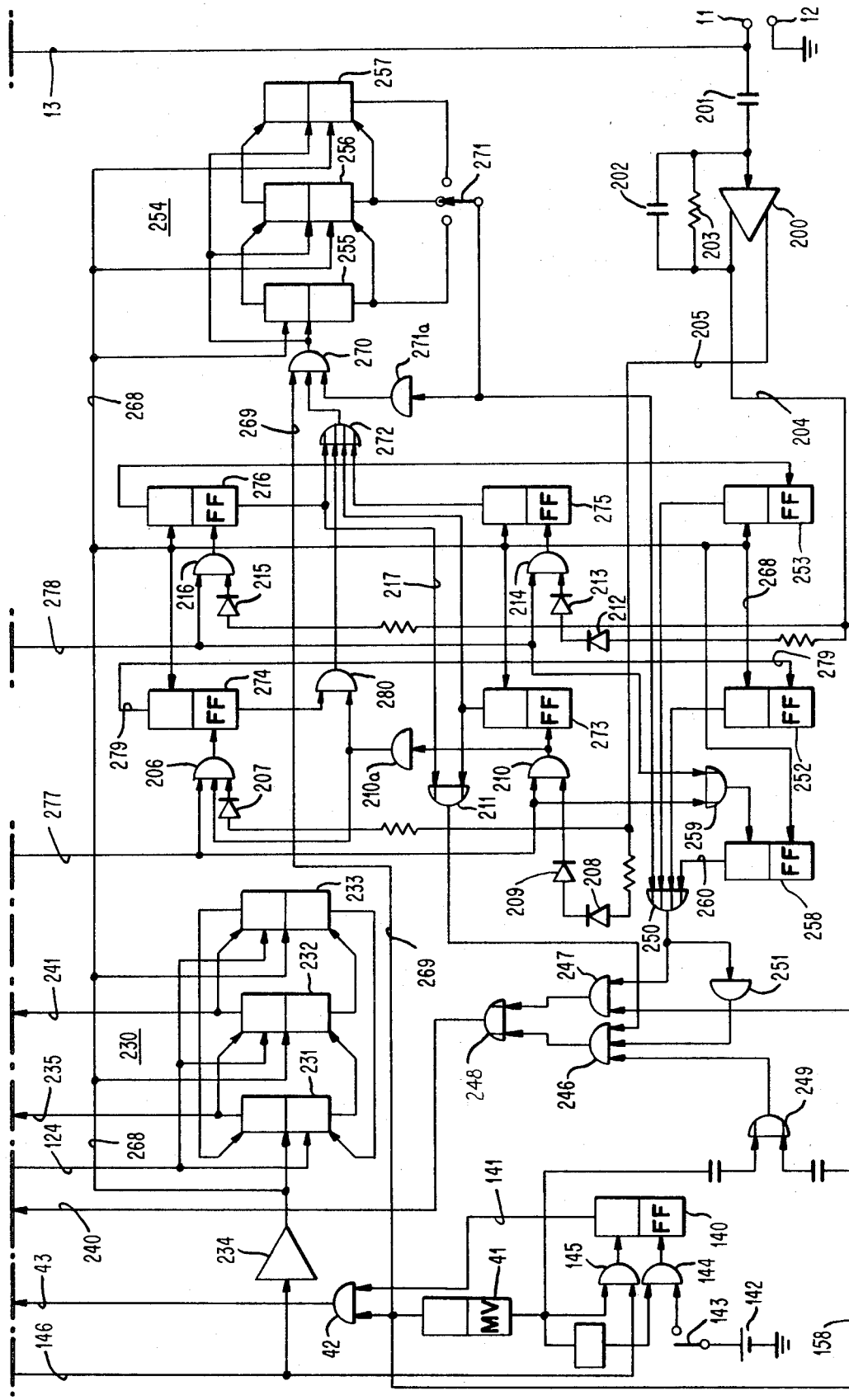

A preferred embodiment of the present invention is shown in FIG. 2 where elements of like function have the same designations as shown in FIG. 1. It is to be noted that the reversible counters 26 and 27 of FIG. 1 have been replaced by conventional binary counters 226 and 227 identical to master counter 24.

In actual operation there is the familiar setup cycle when master reset switch 46 is momentarily closed to reset all of the counters 24, 226 and 227. (The switches 122a and 122b perform a function similar to that of switch 122 in FIG. 1. That is, if only one of the function counters needs to be reset, one of the switches 122a or 122b is closed.) Then start switch 143 is closed momentarily to set the run flip-flop 140 in the active state, producing a "1" signal on conductor 141 to enable AND gate 42. The next pulse from multivibrator 41 applied to the other input of AND gate 42 passes through and by way of conductor 43 and inverter 44 starts the master counter 24 counting. The same pulse does not start function counters 226 and 227 because switches 153 and 154 are purposely in the open position until an output signal is desired at terminals 14 and 15.

Figure 3:
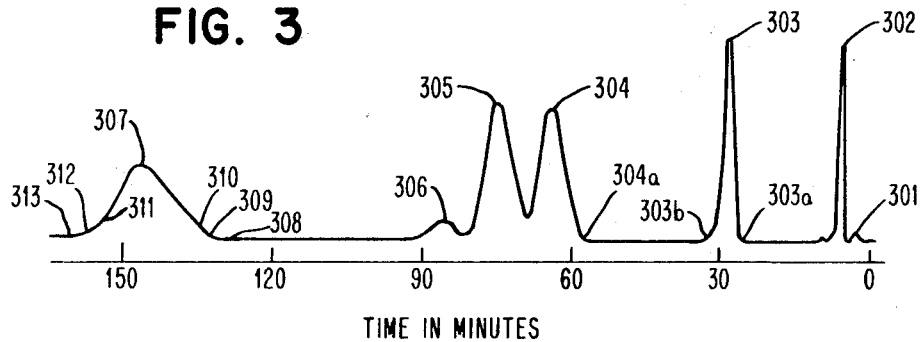
FIG. 3 is a chart record of a typical gas chromatograph.

During setup cycle, a recording monitor is generally used to record a chart such as shown in FIG. 3. If it is desired to have the output of peak 303 appear at terminal 14, it is only necessary to close switch 153 at a time 303a and to close switch 154 at a time 303b. As previously explained, during the run cycles, a zero count in function counter 226 will energize relay coil 19 to close contact 18 thus applying the gas detector output signal to terminal 14. Similarly, a zero count in function counter 227 will energize relay coil 20 to open contact 18.

The equivalent of function counters 28 and 29 of FIG. 1 are not included in FIG. 2 but will be discussed in relation to FIG. 4.

FIG. 2 also shows automatic correction circuitry to take care of the normal drift of the occurrence points 303a and 303b due to a variety of causes well known to those skilled in the art. Such drift may be caused by carrier gas pressure variation, gas separating column aging, etc. The circuitry modifies the pulse count in function counters 226, 227 by periodically sensing the beginning and end of each desired peak during the successive cycles of normal operation and updating the count by either deleting input pulses to that counter or adding extra pulses as needed. In FIG. 2, diodes are used as level discriminators to produce an output when the output of the sample detector is above or below a given level. It will be appreciated that other level discriminators may be used.

The periodic updating of the pulse count in a function counter is selected by a ring counter 230. Ring counter 230 may be reset by way of conductor 124 when the master reset switch 46 is momentarily closed. Assuming this has been done, stage 231 will be in the "1" state while stages 232 and 233 will be in the "0" state. The "1" state of stage 231 produces an output signal on conductor 235 which is applied to one of the inputs of AND gate 236 and by way of inverter 237 to one of the inputs of AND gate 238. When there is no signal on conductor 235, there is an output from inverter 237 which enables AND gate 238 to pass pulses from line 43 to function counter 226 by way of OR gate 239. This is the normal operation of the counter. But since there is a signal on conductor 235, they by way of inverter 237, AND gate 238 is disabled. But AND gate 236 is enabled to permit pulses from conductor 240 to be applied to the counter 226 by way of OR gate 239. The pulses to appear on conductor 240 will be discussed later.

It will be recalled that when master counter 24 has completed a cycle, there will be a signal on conductor 146 which is applied by way of AND gate 145 to reset the run flip-flop 140. This inhibits AND gate 42 to prevent pulses from being transmitted from multivibrator 41 to the counters 24, 226 and 227. However, if the "run" switch 143 is in its closed position, AND gate 144 will be enabled so that flip-flop 140 will immediately be set, again enabling AND gate 42 and thereby permitting pulses to be transmitted from multivibrator 41 along line 43.

The cycle completion signal from counter 24 on conductor 146 is also utilized to step the ring counter 230 by way of amplifier 234. Let us assume that this has happened. Stage 232 is in a "1" state and stages 231 and 233 are in the "0" state. Stage 231 being in the "0" state will enable AND gate 238 and disable AND gate 236, as previously described. Function counter 226 reverts to normal operation.

With stage 232 in the "1" state, there will be a "1" signal on conductor 241 which enables AND gate 242 and by way of inverter 243 disables AND gate 244. With AND gate 242 enabled, pulses from conductor 240 are applied to function counter 227 by way of OR gate 245. Therefore, it is seen that the ring counter 230 periodically programs the pulses from conductor 240 to one of the counters 226, 227.

The pulses appearing on conductor 240 are determined by which of the two AND gates 246, 247 is enabled to apply signals to OR gate 248. The pulses that may pass through AND gate 246 are of twice the repetition rate of multivibrator 41. This is because OR gate 249 applies pulses from both outputs of multivibrator 41 to the AND gate 246. OR gate 249 and associated circuitry provides a source of extra pulses which may be selectively added to the count in a function counter. The AND gate 247 only takes one output of the multivibrator 41. The other input of AND gate 247 comes from OR gate 250. The output of OR gate 250 is also applied to AND gate 246 by way of inverter 251.

The input to OR gate 250 may come from flip-flop 252, flip-flop 253, from a selected output from ring counter 254, or from flip-flop 258. Flip-flops 252 and 253 and ring counter 254 are all reset by the same signal that resets the ring counter 230; namely, from the output of amplifier 234 by way of conductor 268. With both flip-flops 252 and 253 reset, there will be no signal applied from these two flip-flops to OR gate 250. Pulses from multivibrator 41 may appear on one of the inputs of AND gate 270 by way of conductor 269. The enabling of AND gate 270 will be discussed later.

On the occurrence of the zero count in master counter 24, ring counter 230 is stepped to select a function counter for updating. Assume that there is a "1" output from stage 231 via conductor 235 enabling AND gate 236 and via inverter 237 disabling AND gate 238. The same pulse which stepped ring counter 230 to produce a "1" state in stage 231 sets flip-flop 258 via conductor 268. With flip-flop 258 set to the "1" state, a "1" signal is applied through OR gate 250 enabling AND gate 247. The output from multivibrator 41 passes via conductor 158, enabled AND gate 247, OR gate 248, conductor 240, and enabled AND gate 236 to counter 226 thus maintaining the supply of clock pulses from multivibrator 41 to counter 226. The zero count pulse from function counter 226 via conductor 277 and OR gate 259 resets flip-flop 258 to a "0" state so that AND gate 247 is no longer enabled by flip-flop 258 via OR gate 250.

When ring counter 254 is reset, stage 255 will be in the "1" stage; stages 256 and 257 will both be in the "0" state. Assuming AND gate 270 is enabled, then the first pulse will change stage 255 to a "0" state and change stage 256 to a "1" state, but there will be no change in stage 257. The second pulse will change the stage 256 to a "0" state and stage 257 to the "1" state. There will be no changes when additional pulses appear.

When switch 271 is in the left-hand position, AND gate 270 is disabled because during reset of ring counter 254, stage 255 is set to the "1" state producing an output by way of switch contact 271 and inverter 271a disabling AND gate 270. When switch 271 is in the center position, AND gate 270 is enabled because during reset of ring counter 254, stage 256 is set to the "0" state. This "0" state signal by way of switch 271 and inverter 271a provides the enabling signal for AND gate 270. After the occurrence of the next pulse, stage 256 is in the "1" state and AND gate 270 is disabled preventing further pulses through. Thus ring counter 254 selected one pulse. Similarly, when switch 271 is in the right-hand position, ring counter 254 selects two pulses.

Reference is now made to a typical operation of the electronic timer with automatic updating. FIG. 3 shows a strip chart record of a chromatographic analyzer. The cycle time has more than 150 minutes represented on the horizontal scale from right to left. The vertical scale represents the amplitude signal from the detector means which may be a conductivity cell. There are seven peaks in this cycle designated as 301—307. For ease of describing the automatic updating circuit, peak 307 was selected. It is desirable to have the updating feature because a peak such as peak 307 may shift on the time scale due to various causes such as aging of the chromatographic column, and change in the temperature of the column noted before. Therefore, to measure peak 307 it would be desirable to start the measurement at location 309 rather than location 308 or 310. It is obvious that if the measurement starts at location 310 or later, part of the area under the curve will have been lost. On the other hand, if the measurement starts earlier than 308, there may be other peaks or noise that would be entered into the measurement or interfere with some control function.

Returning now to FIG. 2, there is shown a differentiator comprising amplifier 200 and capacitor 201 connected to input terminal 11. The differentiator also has RC network 202, 203 connected in feedback arrangement around amplifier 200 for limiting its bandwidth. Amplifier 200 has two output conductors 204 and 205. Output conductor 205 follows the input and, therefore, is in phase with the input. On the other hand, output conductor 204 is in phase opposition to the input. There are four memory flip-flops for storing the output criteria of amplifier 200. Each of the flip-flops 273, 274, 275 and 276 are reset by the zero count in master counter 24 by way of conductor 146, amplifier 234 and conductor 268.

Assume the function counter 226 has been started at location 309 during the setup cycle. During subsequent run cycles, the output of amplifier 200 on conductor 205 is of low magnitude from time 120 minutes through location 308. This low voltage on conductor 205 is insufficient to overcome the forward voltage drop of diode 207 or diodes 208 and 209 in series. Therefore, there is no signal applied by way of AND gates 210 and 206 to flip-flops 273 and 274 respectively.

If the zero count of function counter 226 had occurred at this time due to a shift phenomenon mentioned earlier, there will be a signal on conductor 277 but neither AND gates 206 nor 210 is enabled. The resulting "0" output of AND gate 210 by way of inverter 210a applies a "1" input to AND gate 280. The other "1" input to AND gate 280 comes from the lower output of flip-flop 274 which was in the reset condition ("0" at the top lead and "1" at the lower lead). Thus the output signal of AND gate 280 passes through OR gate 272 as one input to AND gate 270. Switch 271 is shown in the middle position and stage 256 is in the "0" state producing a "0" signal which by way of inverter 271a changes into a "1" signal as the second input to AND gate 270, thus enabling it. The next pulse from multivibrator 41 by way of conductor 269 will pass through enabled AND gate 270 and step the "1" state from state 255 to stage 256. The "1" state of stage 256 produces a "1" signal which passes through switch 271 and OR gate 250 to enable AND gate 247. The same signal, by way of inverter 251, inhibits AND gate 246. The enabled AND gate 247 allows pulses from multivibrator 41, via conductor 158, to pass to its output. These pulses are applied via OR gate 248, conductor 240, AND gate 236, and OR gate 239 to function counter 226. AND gate 236 had been previously enabled because it was assumed that stage 231 was in the "1" state. It is to be noted the pulse just preceding did not reach function counter 226 because stage 255 was in the "1" state and stage 256 was in the "0" state, presenting a " 0" signal through switch 271 and OR gate 250 to AND gate 247. Hence one pulse has been deleted from the count of function counter 226 while the master counter receives all of the pulses. Therefore, the zero count of function counter 226 will occur one pulse duration later in the next run cycle, nearer to location 309 in FIG. 3. Similarly, if switch 271 is in the right-hand position, the zero count of function counter 226 will occur two pulse durations later in the next run cycle, perhaps at location 309.

Assuming the withholding of two pulses from function counter 226, described above, was sufficient to put the occurrence of zero count at location 309 of FIG. 3, then in the next run cycle the output from amplifier 200 on conductor 205 in FIG. 2 will have increased somewhat, perhaps exceeding the voltage drop of one diode 207 as one input to AND gate 206. However, the signal on conductor 205 is insufficient to exceed the voltage drop of two diodes 208, 209 in series. Therefore, the output of AND gate 210 is in the "1" state. Inverter 210a applies a "1" signal as a second, enabling, input to AND gate 206. If the zero count from counter 226 on conductor 277 occurs at this time, it will pass through enabled AND gate 206 to set flip-flop 274. The "1" state of flip-flop 274 produces a signal on conductor 279 which will set flip-flop 252, thus producing an output applied to OR gate 250 and thence to enable AND gate 247 allowing pulses from multivibrator 41 by way of conductor 158 to flow through conductor 240 uninterrupted. Under this assumed condition, there has been no alteration in the count of the function counter 226 with respect to master counter 24.

Assuming the withholding of two pulses from function counter 26, described above, was sufficient to put the occurrence of its zero count at location 310 in the next run cycle of FIG. 3, then the output of amplifier 200 on conductor 205 is considerably more than the voltage drop of one diode, and exceeds the voltage drop of two diodes 208, 209. Being in excess of the voltage drop of two diodes. AND gate 210 will be enabled and flip-flop 273 will be set to the "1" state producing a signal to OR gate 211 whose output is applied to AND gate 246. The output from AND gate 210 by way of inverter 210a serves to inhibit AND gate 206. Because there is no output from OR gate 250, the inverter 251 enables AND gate 246 and permits the double-repetition rate pulses from OR gate 249 to flow through AND gate 246, OR gate 248 and conductor 240 to function counter 226. The same output from flip-flop 273 is also applied to OR gate 272 thus enabling AND gate 270 permitting pulses to shift the ring counter 254. After the selected two pulses, as selected by switch 271, there will be an output applied to OR gate 250 and thence by way of inverter 251 to disable AND gate 246, thus only adding two of the selected double pulses. At the same time, the output from OR gate 250 enables AND gate 247, thus permitting the normal pulses from conductor 138 to flow through enabled AND gate 247, OR gate 248 and conductor 240 to function counter 226.

The foregoing examples succinctly point out the advantage of an automatic updating scheme for the start of a function in an electronic programmer by making use of the amplitude of the sample gas detector output coincident with the zero count of the function counter as detected by digital circuitry. There will now be described an automatic updating scheme for the end of a function in an electronic programmer using a different set of digital circuitry.

When the occurrence of the zero count of function counter 227 is at location 311 in FIG. 3, the output of amplifier 200 on conductor 204 will be positive and its amplitude greater than the forward voltage drop of two diodes 212 and 213 in series to enable AND gate 214. With AND gate 214 enabled, the zero count signal on conductor 278 will pass through AND gate 214 to set flip-flop 275 to the "1" state. Setting flip-flop 275 to the "1" state produces an output which is applied to OR gate 272 whose output with the "1" output of inverter 271a enables AND gate 270. The "0" state of stage 256 after reset produces a "0" signal at lower output of flip-flop 256. This "0" signal is applied by way of switch 271 to inverter 271a to produce a "1" output. With AND gate 270 thus enabled, the next pulse from multivibrator 41 via conductor 269 passes through AND gate 270 to step ring counter 254, changing the "1" state from stage 255 to stage 256. The "1" state now in stage 256 produces a "1" signal at the lower output. This signal applied by way of switch 271 and inverter 271a becomes a "0" signal at the output of inverter 271a thus disabling AND gate 270, inhibiting further pulses to ring counter 254. The "1" signal from stage 256 is also applied to AND gate 247 via switch 271 and OR gate 250 to enable AND gate 247. With AND gate 247 enabled, pulses from multivibrator 41 via conductor 158 pass through AND gate 247, OR gate 248 and conductor 240 to function counter 227. It is to be noted that AND gate 247 was disabled for only one pulse interval. The deletion of one pulse count from function counter 227 allows the zero count for the next run cycle to occur one pulse duration later.

During the next run cycle, if the zero count of function counter 227 occurs at location 312, the output of amplifier 200 on conductor 204 will be less than the forward voltage drop of two diodes 212, 213 in series but will be still greater than the forward voltage drop of one diode 215 to enable AND gate 216. With AND gate 216 enabled, the zero count signal of function counter 277 via conductor 278 will pass through AND gate 216 to set flip-flop 276 to the "1" state which in turn sets flip-flop 253 to the "1" state. With flip-flop 253 in the "1" state, a "1" signal is produced and passes through OR gate 250 to enable AND gate 247. The enabled AND gate 247 allows the next pulse from multivibrator 41 via conductor 158 to pass through AND gate 247, OR gate 248 and conductor 240 to function counter 227. It should be noted that no pulse has been deleted from the pulse count of function counter 227. Therefore, the occurrence of the zero count will remain unchanged.

During the updating cycle, if the zero count of function counter 227 occurs at location 313, the output from amplifier 200 on conductor 204 will be of a small magnitude, less than the forward drop of one diode, and therefore flip-flop 276 remains in the "0" state. With flip-flop 276 in the "0" state, there is no signal to set flip-flop 253. However, there is a "1" signal output from flip-flop 276 on conductor 217 applied to OR gate 211 and thence to enable AND gate 246, permitting the double repetition pulses to flow through via OR gate 248 and conductor 240 to function counter 227. Conductor 217 is also connected to OR gate 272 for the "1" signal from flip-flop 276 to flow through OR gate 272 to enable AND gate 270, allowing pulses from multivibrator 41 to step ring counter 254. Since switch 271 is shown in the middle position, after one pulse has passed through AND gate 270, the "1" state will have been stepped from stage 255 to stage 256. With the 37 1" state in state 256, the output of inverter 271a will inhibit any further pulses from passing through AND gate 270. This same "1" signal passes through OR gate 250 to enable AND gate 247 and by way of inverter 251, to disable AND gate 246. Therefore, after the passage of one double pulse, the normal pulse from multivibrator 41 flows through AND gate 247 via OR gate 248 and conductor 240 to function counter 227. Thus, one pulse count has been added to function counter 227, and, therefore, the zero count occurrence will be one pulse duration earlier for subsequent run cycles.

SUMMARY OF THE UPDATING CIRCUITRY OF FIG. 2

The operation of the updating circuitry may be summarized as follows. Assume that the count in function counter 226 is too high so that the zero count output occurs at the point 308 (FIG. 3). When the zero count state is actuated, the output of the detector is insufficient to overcome the bias of diode 207 or to overcome the bias of series diodes 208 and 209. Therefore, both flip-flops 273 and 274 remain in the reset condition. AND gate 247 is not enabled. Therefore, the ring counter 254 will step to its second stage, 256, before the AND gate 247 is enabled. That is, the first occurring pulse from multivibrator 41 is deleted. Thus, during this run cycle one less count is supplied to counter 226.

Assume now that the zero count occurs at the point 309 (FIG. 3) during the run cycle. Then the output of the detector is sufficient to overcome the bias of diode 207 but not the forward bias of diodes 208 and 209 in series. Flip-flop 274 is set to its "1" state. As a result, the AND gate 247 is enabled before the occurrence of the first pulse from multivibrator 41. Therefore, the complete set of pulses is supplied to function counter 226; there is no updating or correction performed.

Assume now that the zero count of counter 226 occurs at the point 310, indicating that insufficient pulses have been counted by counter 226 during the previous cycle. In this case, the output of the detector at the point 310 is sufficient to overcome the bias of diodes 208 and 209 in series. Flip-flop 273 is set to its "1" state, enabling AND gate 246, thus permitting double-repetition rate pulses to be supplied to counter 226. When ring counter 254 steps to its second stage, 256, AND gate 246 is disabled and AND gate 247 is enabled. That is, one extra pulse has been added to the count of function counter 226 by the use of double-repetition rate pulses. The operation of correction circuitry for correcting an error on the trailing edge of peak 307 is similar.

ALARM CIRCUITRY FOR INCONSISTENT UPDATING, FIG. 4

Figures 4, 4A:
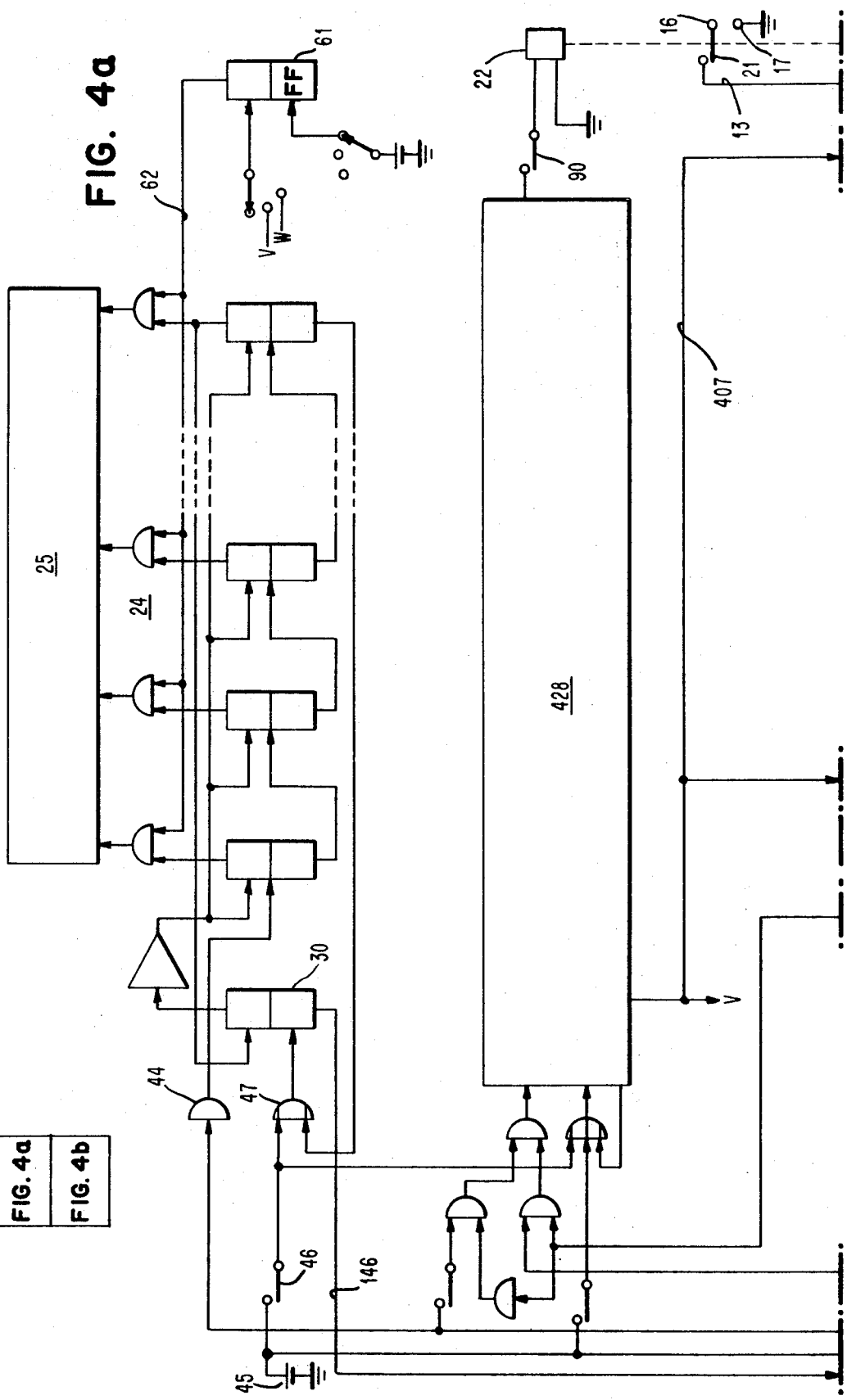
FIG. 4 shows the manner in which FIGS. 4a and 4b fit together.
FIGS. 4a and 4b show a diagram of the programmer using binary function counters with an elapsed time binary counter including updating circuitry and alarm.
Figure 4B:
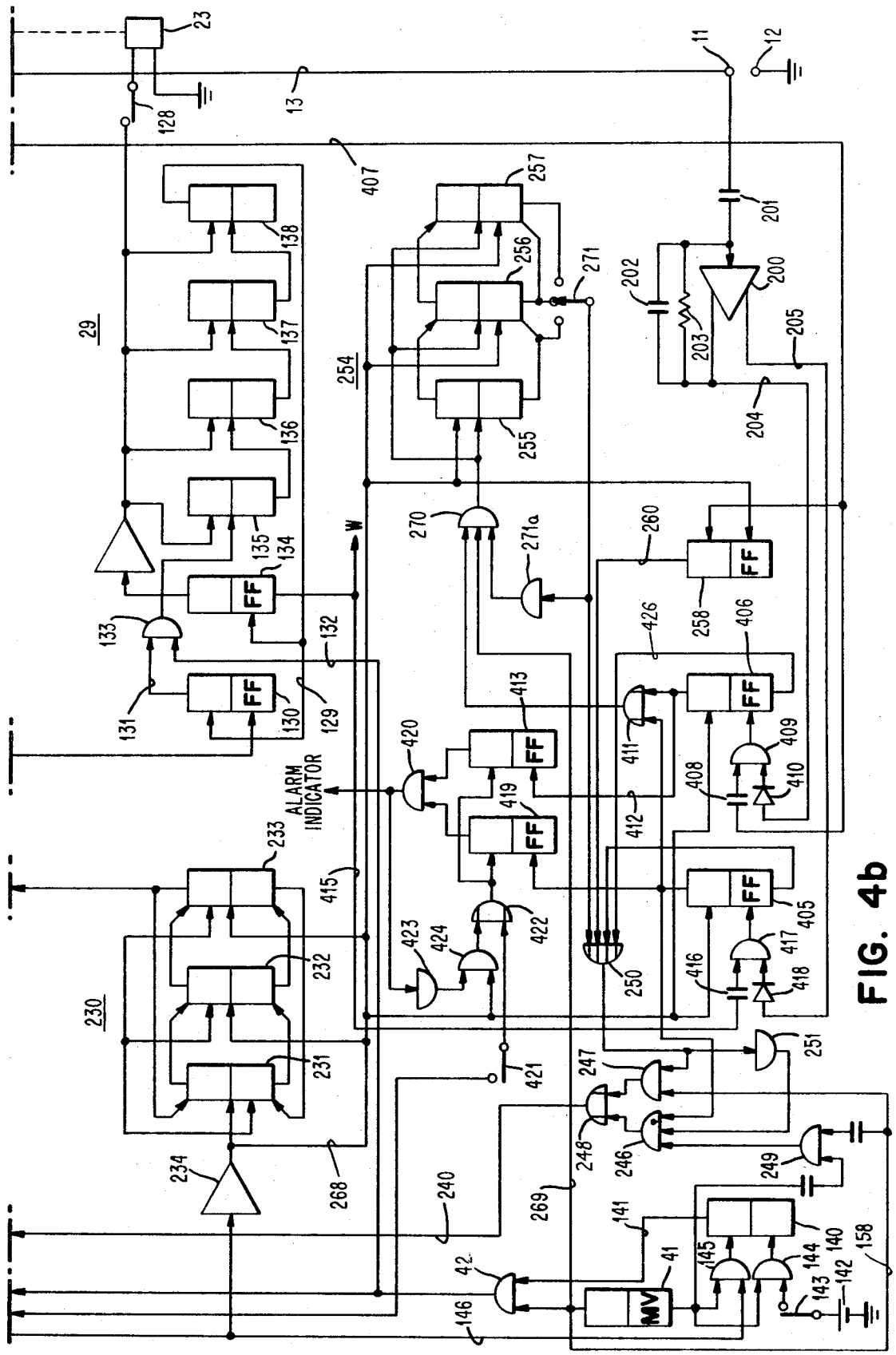

Another preferred embodiment of the present invention is shown in FIG. 4 where elements of like function have the same designations as in FIG. 1. The reversible counter 28 of FIG. 1 has been replaced by a conventional binary counter 428 identical to master counter 24. In addition, there is an automatic updating scheme with alarm features for a condition where both the start and the end of a function need correction.

The operation of function counter 428 is identical to the counters 226, 227 of FIG. 2 and will not be repeated here. The operation of elapsed time counter 29 is identical to the one shown in FIG. 1. The ring counters 230 and 254 are identical to the ones shown in FIG. 2 and their operation will not be repeated here. It will be recalled that ring counter 230 served to select the function counter to be updated during a particular operation cycle and that ring counter 254 served in conjunction with switch 271 to select the number of pulses to be added or deleted in updating the function counters. It will also be recalled that the decision to add or delete pulses for updating a function is made on the basis of the signal condition at the instant when the function is to occur and will now be described.

The output of amplifier 234 on conductor 268 is used to reset flip-flops 405, 406 as well as stages 255 to 257 of ring counter 254. The zero count of function counter 428 appears on a conductor 407 and is applied by way of capacitor 408 to one of the two inputs to AND gate 409. The enabling input to AND gate 409 comes from amplifier 200 by way of conductor 204 and diode 410. Conductor 204 has a positive potential when the sample gas detector is measuring the slope after the peak of a function. Therefore, the embodiment of FIG. 4 is very suitable for programming an interval of time for gas detector zero balance. Such a time interval must lie within a period when no gas constituent peaks will occur. Where the available time period approaches the required time interval (as, for example, the period between times 303b and 304a of FIG. 3), the automatic updating scheme of FIG. 4 tries to maintain the zero balance function within the time period between 303b and 304a of FIG. 3. If it does not, an alarm is sounded.

Assume that the function counter 428 is to have a zero count at a time later than the point 303b. If the zero count of counter 428 occurs at 303b or earlier, the potential on conductor 204, being greater than the forward voltage drop of diode 410, enables AND gate 409. The zero count signal on conductor 407 via capacitor 408 passes through AND gate 409 to set flip-flop 406 to the "1" state. The "1" state of flip-flop 406 produces a "1" signal which passes through OR gate 411 as one of the two enabling inputs to AND gate 270. That "1" signal is also applied via conductor 412 to set one of the alarm flip-flops 413. The "0" signal from the bottom of flip-flop 406 via conductor 426 and OR gate 250 does not enable AND gate 247. If switch 271 is in the middle position as shown in FIG. 4, the "0" signal from stage 256 via inverter 271a serves as the other enabling input for AND gate 270. (The stage 256 is in the "0" state as reset by the output of amplifier 234 via conductor 268.) With the AND gate 270 thus enabled, the next pulse from multivibrator 41 via conductor 269 passes through AND gate 270 to step the "1" state from stage 255 to stage 256. That same pulse does not reach function counter 428 because neither AND gate 246 nor AND gate 247 has been enabled. However, with stage 256 in the "1" state, the "1" signal via switch 271 and inverter 271a disables AND gate 270 to prevent further stepping of ring counter 254. That same "1" signal via switch 271 and OR gate 250 enables AND gate 247 for subsequent pulses from multivibrator 41 via conductor 158 to pass through AND gate 247 and via OR gate 248 and conductor 240 to function counter 428. It is apparent from the above discussion that only one pulse has been prevented from reaching function counter 428. Therefore, the zero count of function counter 428 will occur one pulse duration later in the next operation or run cycle.

The zero count signal of function counter 428 is also applied to the START flip-flop 130 for counter 29 to set it to the "1" state producing a "1" signal output on conductor 131 as an enabling signal to AND gate 133. The signal from multivibrator 41 via conductor 132 passes through AND gate 133 to elapsed time counter 29 The end of count signal of that counter via conductor 129 resets flip-flop 130 to the "0" state, thus inhibiting AND gate 133. The end of count signal via conductor 129 also resets zero count flip-flop 134, producing a zero count signal from elapsed time counter 29 via conductor 415 and capacitor 416 to momentarily enable AND gate 417, allowing an amplifier output signal on conductor 205 via diode 418 to satisfy AND gate 417 to set flip-flop 405 to the "1" state. The potential on conductor 205 will be sufficient to overcome the forward voltage drop of diode 418 only when the sample gas detector has detected the beginning of a new peak such as at the point 304a.

It will be recalled in the previous discussion of function counter 428 it was assumed that a correction was needed and hence alarm flip-flop 413 was set to the "1" state. Now assume that flip-flop 405 is set to the "1" state which in turn sets the second alarm flip-flop 419 to the "1" state. When both alarm flip-flops 413 and 419 are in the "1" state, the two inputs to alarm AND gate 420 are satisfied and an alarm indicator is energized. The alarm indicator may be reset by operating personnel by momentarily closing switch 421, allowing the DC potential of battery 45 to flow through OR gate 422 to reset flip-flops 413 and 419.

If either flip-flop 413 or 419 is in the "1" state, there will only be a "0" output from AND gate 420 which output via inverter 423 becomes an enabling input to AND gate 424. With AND gate 424 thus enabled, the zero count pulse of master counter 24 via conductor 146, amplifier 234 and conductor 268 passes through AND gate 424 and OR gate 422 to reset alarm flip-flops 413 and 419. However, this reset path is inhibited when there is a "1" signal output from AND gate 420 and inverter 423 (corresponding to alarm indicator energized). A "1" signal output from AND gate 420 via inverter 423 becomes a "0" signal applied to AND gate 424 to inhibit that gate.

SUMMARY OF THE ALARM CIRCUITRY

Summarizing the operation of the alarm circuitry, assume that the zero count of counter 428 occurs prior to the point 303b and elapsed time counter 29 produces a count after the point 304a. This is an alarm condition since it indicates there is not sufficient time between the peaks 303 and 304 for proper zero balance.

When the counter 428 produces a zero count signal, the output of the detector is large; therefore, the forward bias of diode 410 is overcome and flip-flop 406 is set. Alarm flip-flop 413 is set. When the counter 29 produces a zero count signal, the output of the detector is large again Therefore, the forward bias of diode 418 is overcome and flip-flop 405 is set. Alarm flip-flop 419 is set. Flip-flops 413 and 419 enable the alarm AND gate 420 which produces an alarm indication.

FLUID LOGIC ACTUATION OF THE SAMPLE INJECTION

As previously discussed, it is desired to have the sample fluid injection actuated automatically upon the occurrence of the one count of the cycle counter 24 of FIG. 1. Also, as previously discussed, there are many applications wherein the control element must be actuated hydraulically, or pneumatically. The fluid logic circuit shown in FIG. 5 is particularly suitable for actuating the fluid injection in these applications.

Figure 5:
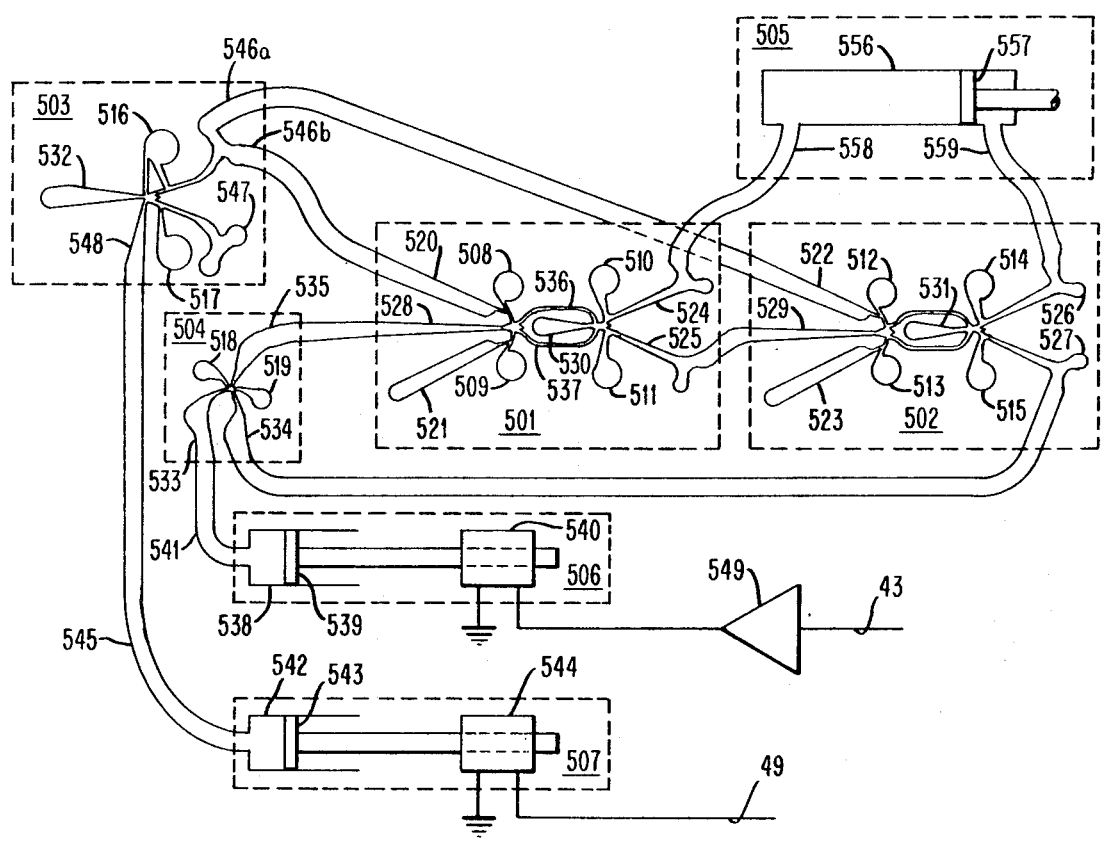
FIG. 5 shows fluidic logic circuitry for actuating the sample injection.

Briefly, FIG. 5 shows a pneumatic cylinder assembly 505 which is energized by fluid logic upon the detection of the actuation of the "one count" stage of counter 24. Specifically, the pulse on line 43 which actuates the one count stage of counter 24 also acts through the fluid logic to actuate cylinder 505. The cylinder 505 is returned to its normal condition upon the occurrence of the next pulse and will not thereafter be actuated by pulses occurring on line 43.

The fluid logic circuitry for accomplishing this will now be described.

FLUIDIC SAMPLE INJECTION LOGIC

Shown in FIG. 5 are: binary counter stages 501, 502; monostable flip-flop 503; AND gate 504; a double-acting pneumatic cylinder 505; and electrofluidic transducer means 506 and 507.

The fluidic elements 501, 502, 503 and 504 which are shown represent commercially available components. The binary counter stages 501, 502 are Bowles Engineering Co. B-106-A three input binary counters. The monostable flip-flop 502 is a Bowles Engineering Co. B- 102-A three input OR (only one input is shown). The AND gate 504 is a Bowles Engineering Co. B- 103-A passive AND, two input. The mode of operation of elements 501—507 will now be described. Binary counter stage 501 has a "reset" input 520, a "set" input 521, a count input 528 and a power supply port 530. Vents 508—511 are provided to achieve stability over a wide range of input and output operating conditions. The two output ports 524 and 525 will be called the "1" and "0" outputs respectively in the following descriptions. Two connecting passages 536 and 537 will be called count steering passages. Assume that a "reset" flow signal has been received at "reset" input 520. This flow signal will be conducted via count steering passage 536 and will drive the power stream from supply port 530 into output port 525. The flow passages are so designed that once the power stream has been driven to one output port, the output state will remain even though the input is removed. The flow passages are also designed so that when the power flow if out of the "0" output 525, a reduced pressure is developed in count steering passage 537, and when the power flow is out of the "1" output 524, a reduced pressure is developed in count steering passage 536. With the power flow driven to the "0" output 525 by a reset flow signal, a low pressure will exist in count steering passage 537 so that when a "count" signal is received at the count input port 528, the flow of that signal will be drawn by the low pressure in passage 537 to flow through passage 537. Again, the passage design is such that once flow has been established in a count steering passage, it will continue to flow through that passage until the flow is interrupted at its source. The count signal flow through count steering passage 537 will cause the power stream from supply port 530 to switch from the "0" output port 525 to the "1" output port 524 producing a "1" output.

With the power stream now flowing to the "1" output 524, a low pressure is induced in count flow steering passage 536 so that the next "count" signal received at count input port 528 will flow through count steering passage 536 and will cause the power stream to switch from the "1" output 524 to the "0" output 525.

The monostable flip-flop 503 has a power supply port 532, a control input 548, vents 516 and 517, a "1" output port with two connections 546a, and 546b, and a "0" output port 547. In the absence of an input flow signal to input port 548, the power stream passes from the power input port 53 to the "0" output port 547 and is vented. When an input flow signal is present at input port 548, the power stream is switched to the "1" output ports 546a, and 546b.

The AND gate 504 produces an output flow through its output port 535 only when input flow signals are present at both input ports 533 and 534. When there is an input only at input port 533, that input flow is vented through vent 519. When there is an input only at input port 534, that input flow is vented through vent 518.

The double-acting pneumatic cylinder 505 is of a commonly used type comprising a cylinder member 556, pressure application ports 558 and 559 at either end and a piston 557. The pneumatic cylinder 505 serves as an output mechanical actuator.

Two electrical to fluidic signal converters 506 and 507 provide fluidic input signals in response to electrical signals. The signal converters 506 and 507 comprise pneumatic cylinders 538 and 542, respectively, having respective output ports 541 and 545, pistons 539 and 543, respectively, and piston drive solenoids 540 and 544, respectively.

The purpose of the circuit of FIG. 5 in conjunction with the circuit of FIG. 1 is to actuate a chromatographic sample injection means on the count of "1" of counter 24, FIG. 1, and to release said sample injection means on the count of "2" of counter 24, FIG. 1.

Assume that a count of "0" has just been achieved in counter 24, FIG. 1. There will be a "reset" signal from "0" count stage 30 via amplifier 48 and conductor 49 to piston solenoid 544, FIG. 5. Piston 543 will be driven producing a flow through port 545 to the control input port 548 of the monostable flip-flop 503. During the period of flow into the control input port 548, the flip-flop 503 will have a flow out its "1" output ports 546a and 546b to the "reset" inputs 520 and 522 of binary counter stages 501 and 502, respectively. The binary counter stages 501 and 502 being thereby reset will have "1" state flow out their "0" output ports 525 and 527, respectively. Flow from the "0" output 525 of stage 501 is conducted to the count input 529 of stage 502. This flow will not affect counter stage 502 because its reset signal is overriding. Flow from the "0" output 527 of stage 502 is conducted to one input 534 of AND gate 504 thus enabling it.

The first subsequent count pulse from conductor 43, FIG. 1, passing through amplifier 549, FIG. 5, will energize solenoid 540 of electric to fluidic converter 506 to actuate piston 539 producing a flow through port 541 to the second input port 533 of enabled AND gate 504. The resulting AND flow signal through port 535 to the count input port 528 of counter stage 501 will cause counter stage 501 to change state to a count of "1" having an output flow from its "1" output port 524. This output flow via port 558 of the pneumatic actuator 505 will drive the piston 557 providing the required sample injection means actuation.

The next count pulse from conductor 43 will in like manner cause a flow signal at count input port 528 of counter stage 501, changing the state of counter stage 501 back to "0." With the return of counter stage 501 to the "0."state, there will again be a flow from its "0" output port 525 to the count input port 529 of counter stage 502 causing counter stage 502 to change to its "1" state thereby recording a count of "2."

On the occurrence of the count of "2," counter 502 will have a "1" state flow out its "1" output port 526. This flow conducted via port 559 of pneumatic actuator 505 will drive piston 557 back to the position for release of the chromatographic sample injection means. Also on the count of "2," the "0" output port 527 of counter stage 502 will go to its "0" state. There will, therefore, no longer be flow from output port 527 to enable AND gate 504. Because the AND gate 504 is no longer enabled, no subsequent clock pulses on conductor 43 will be counted and the count of "2" will remain until the next reset pulse is received via conductor 49.

It may be noted that the initial condition of the pneumatic actuator 505 is undefined, although it is defined after the first cycle of operation. IF this uncertainty of initial condition is unacceptable, a spring return type of actuator may be substituted for actuator 505 in which case the connection between the "1" output 526 of counter stage 502 and port 559 is redundant.

While a specific application of fluid logic to the control of the sample injection has been described here, it will be understood that fluid logic could be used to control other control elements. Furthermore, it will be appreciated that fluid logic could be used for other parts of the programmer. Fluid logic components of the type shown in FIG. 5, or other commercially available fluid logic elements, can be used to duplicate all or part of the functions performed by the electronic logic shown in FIGS. 1, 2 and 4.

While particular embodiments of the invention have been shown and described, it will, of course, be understood that various modifications may be made without departing from the principles of the invention. The appended claims are, therefore, intended to cover any such modification within the true spirit and scope of the invention.

I claim:

1. In combination with combination a process chromatography system for measuring the constituents of a sample including a sample injector, a sample detector responsive to said constituents, and control elements which are actuated in timed sequence with the detection of said constituents during a run cycle, a programmer for programming a plurality of sequential functions to be performed by said control elements, said programmer comprising:
    a source of repetitive pulses,
    a cycle counter having a zero count stage,
    a plurality of function counters each having a zero count stage,
    means for applying pulses from said source to said cycle function counter and said function counters in timed relation with the actuation of said sample injector,
    means for applying said pulses to said function counters during a setup cycle so that the count in said counters, after said setup cycle, represents the desired time occurrence relative to sample injection of said functions to be performed,
    means for applying said pulses to said counters during said run cycle so that actuation of said zero count stage of each of said function counters occurs at the time that the associated function is to be performed relative to sample injection, and
    means responsive to actuation of said zero count stage of each function counter for controlling an associated control element.

2. The system recited in claim 1 wherein each of said function counters is a reversible counter, switch means for switching said counters to a reverse counting mode during said setup cycle and to the forward counting mode during said run cycle, said system further comprising:
    switch means operable at the time of occurrence of the functions to be performed to terminate the supply of pulses to each of said function counters during a setup cycle.

3. THe system recited in claim 1 wherein each of said function counters is a one-way counter, said system further comprising:
    switch means operable at the time of occurrence of a function during a setup cycle to initiate the supply of pulses to the function counter which controls that function, said last-named means being enabled only during a setup cycle.

4. The system recited in claim 1 further including correction circuitry comprising:
    a correction counter, pulses from said source being supplied to said correction counter during a correction cycle,
    an AND gate, pulses from said source being selectively supplied through said AND gate to a function counter which is to be corrected, and
    means for inhibiting said AND gate when said correction counter has stepped through selected stages so that only a selected number of pulses are supplied to said function counter during a correction cycle.

5. The system recited in claim 4 wherein each of said function counters is a reversible counter, said system further comprising a manually operated switch selectively operated to supply pulses from said AND gate to a function counter in either the forward or reverse counting mode so that correction pulses can be added to or subtracted from the count in said function counter.

6. The system recited in claim 4 wherein each of said function counters is a reversible counter, said system further comprising:
    an extra pulse source responsive to said source of pulses for producing extra pulses,
    an AND gate connected between said source of pulses and a function counter to be corrected for inhibiting the supply of pulses to said function counter, and
    means for selectively actuating said extra pulse source or said AND gate to add or to delete pulses from the count in said function counters during a run cycle.

7. The system recited in claim 1 further including automatic updating circuitry comprising:
    level discriminator means, the output of said sample detector being applied to said level discriminator means, said level discriminator means producing a first output when the output of said sample detector is below a first given level, said level discriminator means producing a second, different, output when the output of said sample detector is above a second given level,
    first means for deleting at least one pulse from said repetitive pulses which are supplied to said function counters, second means for supplying at least a double pulse to the supply of repetitive pulses applied to said function counter, and coincidence circuitry connected to the output of said level discriminator means for selectively enabling said first means in response to said first output and for selectively enabling said second means in response to said second output.

8. The system recited in claim 7 further comprising:

a differentiating amplifier interposed between said sample detector and said level discriminators for modifying said sample detector output to represent the rate of change of constituent.

9. The system recited in claim 1 further including alarm circuitry indicating that the time spacing between the detection of two constituents is below a desired minimum time comprising:

an elapsed time counter means for starting the counting of said elapsed time counter in response to actuation of the zero count stage of one of said function counters, level discriminating means producing a first output if the output of said sample detector is above a given level when the zero count state of said function counter is actuated and producing a second output if the output of said sample detector is above a given minimum when the zero count stage of said elapsed time counter is actuated, and an alarm actuated only when said level discriminating means produces both of said outputs during a cycle.

10. The system recited in claim 9 wherein the zero count stage of said function counter initiates the sample detector zero balance of said system, said elapsed time counter having a number of stages such that the counting time of said elapsed time counter is sufficient for said zero balance operation to be performed.

11. The system recited in claim 9 further comprising:

first and second alarm flip-flops said first and second outputs of said level discriminating means being applied to set said first and second flip-flops respectively, said alarm being actuated by the set condition of both of said flip-flops, and means for resetting said flip-flops if only one of said flip-flops has been set during a particular cycle.

12. The system recited in claim 1 wherein said cycle counter includes a first count stage further comprising:

a manually operated start switch for initiating a train of pulses from said source, means for detecting the actuation of the first count stage of said cycle counter by a pulse from said source, and means to control sample injection in said system in response to detection of said actuation of the first count stage.

13. The system recited in claim 1 further including a bistable fluid logic circuitry which is set in time relation with the application of pulses from said source to said cycle counter, and a fluid-mechanical actuator connected to said fluid logic circuit, said actuator being connected to actuate said sample injector when said bistable fluid logic circuit is set.

14. The system recited in claim 13 wherein said fluid logic circuit responds to said train of pulses from said source, the first count stage of said cycle counter being connected to said bistable fluid logic circuit to set it to a "1" output upon the occurrence of the pulse in said train which actuates said first count stage, the "1" output of said fluid logic circuitry being applied to said fluid-mechanical actuator to initiate said sample injection.

15. The system recited in claim 1 further including means for displaying the time of occurrence of each function performed during a run cycle comprising:

an indicating device, gating circuitry connected between the stages of said cycle counter and said indicating device so that said indicating device normally displays the count in said cycle counter, and means for inhibiting said gating circuitry in response to actuation of the zero count stage of a selected function counter.

16. In a process control system wherein control elements are actuated in timed sequence, a programmer for programming said control element in the desired time sequence comprising:

a cycle counter having a zero count stage, a plurality of function counters each having a zero count stage, said cycle counter and said function counters being supplied with repetitive pulses from a common source, means for applying said pulses to said function counters during a setup cycle so that the count in said counters, after said setup cycle, represents the desired time occurrence relative to the beginning of the cycle of said functions to be performed, means for applying said pulses to said counters during a run cycle so that actuation of said zero count stage of each of said function counters occurs at the time that the associated function is to be performed relative to the beginning of the cycle, and means responsive to actuation of said zero count stage of each function counter for controlling an associated control element.

17. The programmer recited in claim 16 wherein said cycle and function counters and said means for applying pulses to said function and cycle counters include electronic logic circuitry.